Feb. 5, 1952  F. G. SCHMIDT  2,584,231
FISHHOOK BAITER
Filed Aug. 9, 1950

F. G. Schmidt
INVENTOR
BY CA Snow &Co.
ATTORNEYS.

Patented Feb. 5, 1952

2,584,231

UNITED STATES PATENT OFFICE 2,584,231

FISHHOOK BAITER

Frank G. Schmidt, San Jose, Calif.

Application August 9, 1950, Serial No. 178,421

1 Claim. (Cl. 43—4)

This invention relates to a device designed for use in baiting fish hooks, the primary object of the invention being to provide a device for facilitating the handling of the bait and securing the bait on the hooks in such a way that the bait will be firmly held thereon, even after the bait becomes mushy and otherwise deteriorated to a point where it would not be retained on a hook if the hook were baited in the usual way.

Another important object of the invention is to to provide a device of this character which will provide an even and smooth opening through the bait to insure the bait being held on the hooks in such a way that it will not become displaced readily.

Still another object of the invention is to provide means for baiting a fish hook which will conceal the hook to render it practically impossible to remove the bait without contacting the hook, which would result in the fish attempting to remove the bait, being caught.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
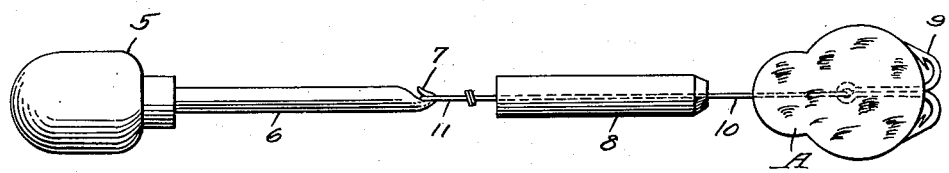
Figure 1 is a side elevational view of a baiter constructed in accordance with the invention, and illustrating the bait as having been secured on a hook.
Figure 2:
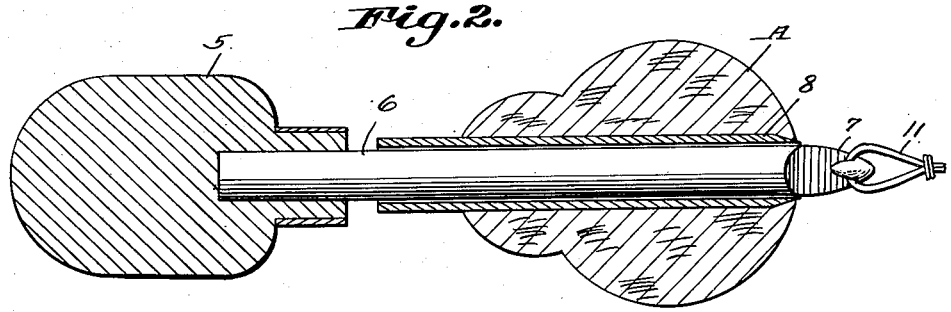
Fig. 2 is a longitudinal sectional view through the device, showing the bait as secured on the movable sleeve prior to the positioning of the bait against a fish hook.

Referring to the drawing in detail, the device comprises a handle 5 from which the shank 6 extends, the shank 6 having the skewer hook 7 formed on its free end. The shank 6 is of a diameter to accommodate the baiting sleeve 8 on which the bait indicated at A, is positioned for baiting the fishing hook.

Figure 3:
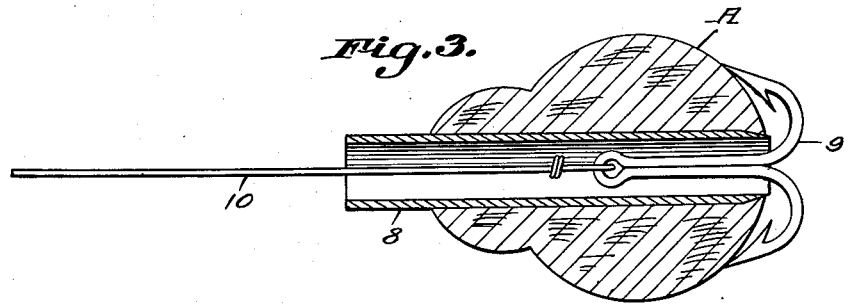
Fig. 3 is a view illustrating the baiting sleeve and bait as moved to a position adjacent to a fish hook, so that when the sleeve has been removed, the bait will remain attached to the fish hook.

As shown by Fig. 3 of the drawing, the fishing hook which is of the double or triple prong type, is indicated by the reference character 9, and the reference character 10 indicates the gut which is attached to the hook, and which is formed with the loop 11, to be attached to the usual fishing line.

Figure 4:
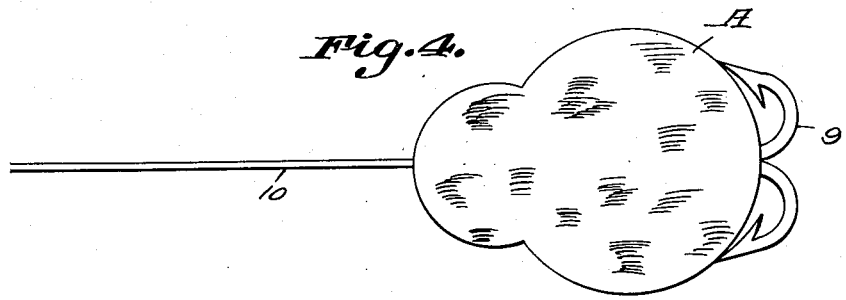
Fig. 4 is a view illustrating the baited fish hook when baited with the device, forming the subject matter of the present invention.

In using the baiter, the shank or skewer 6, is held in one hand, and the baiting sleeve 8 which has been forced centrally through the bait, which may be in the form of a chunk of meat, sand crabs, bugs, minnows, frogs, or the like, is positioned over the shank or skewer 6 and moved to a position towards the handle 5 clear of the skewer hook 7. The loop 11 of the gut 10 is now positioned over the skewer hook. With the gut 10 in this position, the sleeve is now moved over the loop and gut, where it is passed onto the fishing hook 9 in a manner as shown by Fig. 3 of the drawing. When the sleeve and bait have been so positioned, the sleeve is removed, allowing the bait to remain in contact with the prongs of the hook, as shown by Fig. 4 of the drawing, whereupon the bait is securely held in position and cannot be readily removed as could happen if the bait were positioned on the fishing hook in the usual manner, that is by placing the bait over the outer ends of the prongs of the hook, 7.

From the foregoing it is believed that the operation and construction of applicant's device will be clear, and that further detail disclosure as to the use of the device is unnecessary.

Having thus described the invention, what is claimed is:

A baiter for baiting fish hooks having a gut lead formed with a loop, comprising a rectilinear skewer having a skewer hook at one end thereof the transverse dimension of the entire skewer hook being of a size less than the largest transverse dimension of the skewer, a baiting sleeve open at opposite ends on which bait is held, adapted to be slid over said skewer past said skewer hook, said hook adapted to be extended through the loop of a gut fish hook lead, connecting the fish hook to the skewer, and said sleeve and bait being movable over the gut lead and skewer hook carrying the bait to the fish hook, and said sleeve being removable from the bait and skewer hook depositing the bait on the fish hook.

FRANK G. SCHMIDT.

REFERENCES CITED

The following references are of record in the file of this patent:

UNITED STATES PATENTS

| Number | Name | Date |
|---|---|---|
| 1,152,698 | Bonner | Sept. 7, 1915 |
| 2,164,708 | Hadaway | July 4, 1939 |
| 2,564,216 | Stark | Aug. 14, 1951 |